United States Patent [19]

Sonnet

[11] 4,273,415
[45] Jun. 16, 1981

[54] OPTICAL OBJECTIVE

[75] Inventor: Günther Sonnet, Bad Kreuznach, Fed. Rep. of Germany

[73] Assignee: Jos. Schneider & Co., Optische Werke, Bad Kreuznach, Fed. Rep. of Germany

[21] Appl. No.: 85,238

[22] Filed: Oct. 16, 1979

[30] Foreign Application Priority Data

Oct. 18, 1978 [DE] Fed. Rep. of Germany ....... 2845247

[51] Int. Cl.³ .............................................. G02B 9/60
[52] U.S. Cl. .................................................. 350/465
[58] Field of Search .......................................... 350/216

[56] References Cited

U.S. PATENT DOCUMENTS 3,817,599  6/1974  McCrobie ..................... 350/216 X
4,165,916  8/1979  Nakamura ..................... 350/216 X

*Primary Examiner*—Paul A. Sacher
*Attorney, Agent, or Firm*—Karl F. Ross

[57] ABSTRACT

An optical objective, usable for reproduction as well as for photographic and cinematographic purposes, consists of five components—two on the object side and three on the image side of a diaphragm space—constituted by a total of seven meniscus-shaped lenses all of whose surfaces are concave toward the diaphragm space, the first object-side component and the middle image-side component being negatively refracting doublets. The objective is bodily movable for focusing purposes and its two object-side components are correlatedly axially shiftable to minimize aberrations over a wide range of magnification ratios.

6 Claims, 2 Drawing Figures

OPTICAL OBJECTIVE

FIELD OF THE INVENTION

My present invention relates to an optical objective adapted to be used for reproduction of documents or the like as well as for photographic and cinematographic purposes.

BACKGROUND OF THE INVENTION

A known reproduction objective consists of two front components and three rear components separated by an intervening diaphragm space, i.e. a negatively refracting first component and a positively refracting second component on the object side and a positively refracting third component, a negatively refracting fourth component and a positively refracting fifth component on the image side of that space. The two negatively refracting components may be doublets, each composed of two lenses of opposite refractivity, while the others are singlets.

In such an objective it is important to provide satisfactory correction of optical aberrations over the entire field of view, at least for a particular magnification ratio with which it is to be used. When this ratio is subject to variation, the requirements become more stringent.

OBJECT OF THE INVENTION

The object of my present invention, therefore, is to provide an optical objective of this type which can be used over a wide range of magnification ratios with a relatively large aperture, preferably as high as 1:3.5.

SUMMARY OF THE INVENTION

In accordance with one aspect of my present invention, the constituent lenses of a five-component objective as described above are so dimensioned that their individual focal lengths have absolute magnitudes which, progressing from the first to the fifth component, are related to one another in the ratio of substantially 7.5:1.1:2.7:9.7:1.6, each lens being bounded by spherically curved surfaces which are concave toward the diaphragm space. These individual focal lengths may also be expressed, in terms of the overall focal length F of the objective, by $$f_I \approx -7.5F, f_{II} \approx +1.1F, f_{III} \approx +2.7F, f_{IV} \approx -9.7F, f_V \approx +1.6F.$$

I have found that such an objective, which is bodily movable for focusing purposes between the object plane and the image plane of a reproduction camera, is well corrected for a certain magnification ratio, e.g. of about 1:5, as determined by the positions of these planes in relation to the focal points of the objective. With other magnification ratios above and below this value, however, distortions are encountered which can be corrected, pursuant to a further feature of my invention, by axially shifting the first and second components at different rates but in a correlated manner. More particularly, these components are to be displaced codirectionally, with the first component moving more slowly than the second. Such correlated shifting, pursuant to my invention, could also be used in a differently dimensioned objective of this general type.

BRIEF DESCRIPTION OF THE DRAWING

The above and other features of my invention will now be described in detail with reference to the accompanying drawing in which.

SPECIFIC DESCRIPTION

Figure 1:
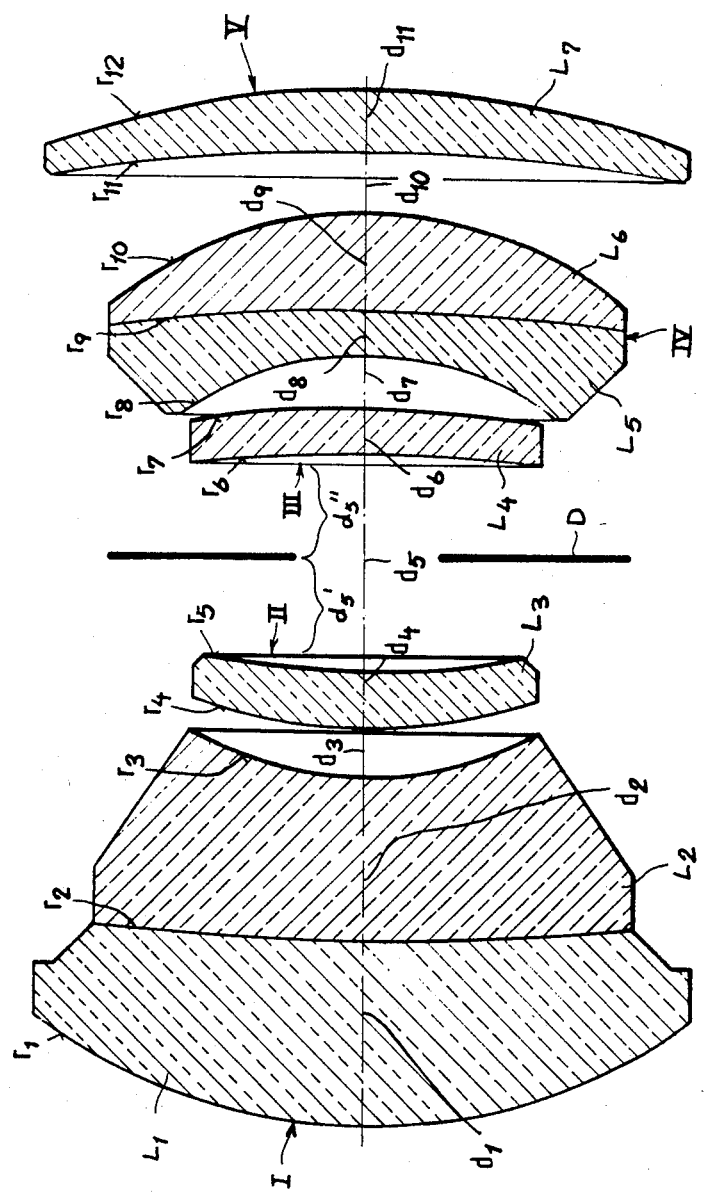
FIG. 1 is a diagrammatic view of an objective embodying my invention.

In FIG. 1 I have shown an objective consisting of five components I, II, III, IV and V. Component I is a negatively refracting doublet consisting of a positive lens $L_1$, with radii $r_1$, $r_2$ and thickness $d_1$, and of a negative lens $L_2$, with radii $r_2$, $r_3$ and thickness $d_2$. A limitedly variable air space $d_3$ separates this doublet from component II which is a single positive lens $L_3$ with radii $r_4$, $r_5$ and thickness $d_4$. Component III, separated from component II by a diaphragm space $d_5$ which is also limitedly variable, is a similar singlet $L_4$ with radii $r_6$, $r_7$ and thickness $d_6$. After a fixed air space $d_7$ there follows component IV which is also a negatively refracting doublet, consisting of a negative lens $L_5$ (radii $r_8$, $r_9$ and thickness $d_8$) cemented onto a positive lens $L_6$ (radii $r_9$, $r_{10}$ and thickness $d_9$). A further fixed air space $d_{10}$ lies between components IV and V, the latter being again a positive singlet with radii $r_{11}$, $r_{12}$ and thickness $d_{11}$. The cemented surfaces $r_2$ and $r_9$ are only weakly refractive.

All lenses $L_1$–$L_7$ are menisci withe surfaces concave toward diaphragm space $d_5$ so that their radii have positive sign ahead of that space and negative sign beyond it. A diaphragm D within space $d_5$ is separated from lens $L_3$ by a distance $d_5'$ and from lens $L_4$ by a distance $d_5'' = d_5 - d_5'$. Components I and II may be coupled together by a conventional camming sleeve, not shown, having guide grooves for correlatedly displacing them.

Based upon an overall focal length F of unity value, the radii $r_1$–$r_{12}$ and the thicknesses and separations $d_1$–$d_{11}$ of lenses $L_1$–$L_7$ have numerical values as given in the following Table A which also lists their refractive indices $n_e$ and Abbé numbers $v_e$ together with their surface powers $\Delta n/r$.

TABLE A

| Lenses | Radii | Thicknesses and Separations | $n_e$ | $v_e$ | $\frac{\Delta n}{r}$ |
|---|---|---|---|---|---|
| $L_1$ | $r_1 = +0.311$ | | | | +2.01 |
| | | $d_1 = 0.110$ | 1.625 | 56.6 | |
| | $r_2 = +7.784$ | | | | −0.005 |
| $L_2$ | | $d_2 = 0.084$ | 1.584 | 40.6 | |
| | $r_3 = +0.207$ | | | | −2.82 |
| | | $d_3 = 0.026$ | (variable) | | |
| | $r_4 = +0.311$ | | | | +2.20 |
| $L_3$ | | $d_4 = 0.030$ | 1.685 | 47.9 | |
| | $r_5 = +0.498$ | | | | −1.37 |
| | | $d_5 = 0.121$ | (variable) | | |
| | $r_6 = -0.912$ | | | | −0.75 |
| $L_4$ | | $d_6 = 0.023$ | 1.685 | 47.9 | |
| | $r_7 = -0.622$ | | | | +1.10 |
| | | $d_7 = 0.030$ | | | |
| | $r_8 = -0.181$ | | | | −3.48 |
| $L_5$ | | $d_8 = 0.026$ | 1.629 | 35.3 | |
| | $r_9 = -1.243$ | | | | −0.03 |
| $L_6$ | | $d_9 = 0.056$ | 1.670 | 48.1 | |
| | $r_{10} = -0.230$ | | | | +2.91 |
| | | $d_{10} = 0.033$ | | | |
| | $r_{11} = -1.095$ | | | | −0.57 |
| $L_7$ | | $d_{11} = 0.033$ | 1.622 | 60.0 | |

TABLE A-continued

| Lenses | Radii | Thicknesses and Separations | $n_e$ | $v_e$ | $\frac{\Delta n}{r}$ |
|---|---|---|---|---|---|
| | $r_{12} = -0.536$ | | | | +1.16 |

On the same basis the individual focal lengths $f_I$–$f_V$ of components I-V have the numerical values of −7.5, +1.1, +2.7, −9.7 and +1.6, respectively. This objective has a relative aperture of 1:3.5 and, at maximum diaphragm opening, is very well corrected throughout its field of view with a magnification ratio which may range from 1:2 to 1:12, provided that fractional adjustments are made in the air spaces $d_3$ and $d_5$.

Figure 2:
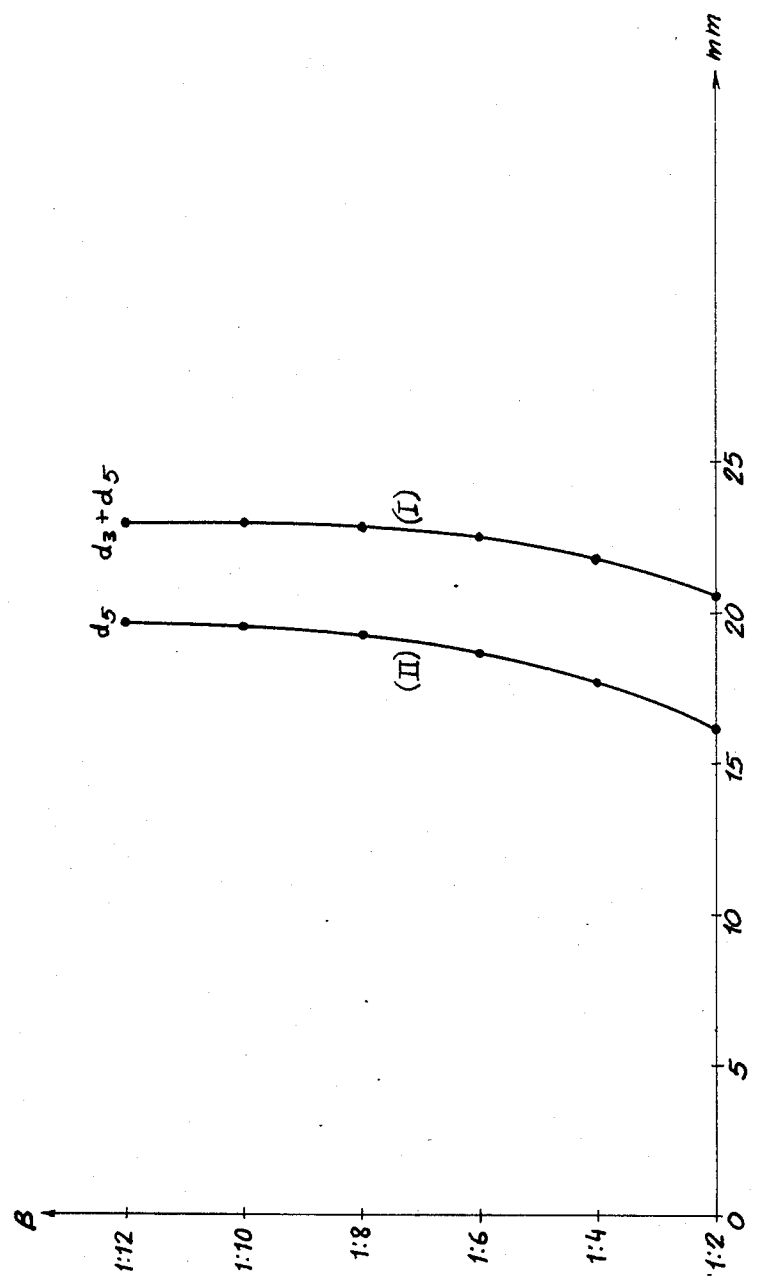
FIG. 2 is a graph showing the relative motion of the two front components of the objective with variations in the magnification ratio.

The following Table B gives the optimum values of spaces $d_3$ and $d_5$ for six different magnification ratios $\beta$ in an objective as shown in FIG. 1. These spacings have also been graphically represented in FIG. 2 which clearly shows that components I and II shift codirectionally, with the former moving more slowly than the latter. The diaphragm D is separated from lens $L_4$ by a distance $d_5''$ of 0.061.

TABLE B

| $\beta$ | $d_3$ | $d_5$ | $d_3 + d_5$ |
|---|---|---|---|
| 1:12 | 0.021 | 0.130 | 0.151 |
| 1:10 | 0.022 | 0.129 | 0.151 |
| 1:8 | 0.023 | 0.127 | 0.150 |
| 1:6 | 0.025 | 0.124 | 0.149 |
| 1:4 | 0.027 | 0.117 | 0.144 |
| 1:2 | 0.030 | 0.106 | 0.136 |

The actual value of focal length F may be 150 mm. For the taking of photographic or cinematographic pictures with bodily shifting of the entire objective for focusing purposes, the components are advantageously left in the relative position given for $\beta = 1:12$. The values for $d_3$ and $d_5$ given in Table A are for $\beta = 1:5$; the overall shift of components I ($d_3 + d_5$) and II ($d_5$) amounts to 0.009F and 0.015F, respectively.

I claim:

1. An optical objective consisting of a negatively refracting first component, a positively refracting second component, a positively refracting third components, a negatively refracting fourth component and a positively refracting fifth component, said second and third components being separated by a diaphragm space, said first and second components being coupled for correlated codirectional axial shifts at a relatively slow and a relatively fast rate, respectively, to minimize optical aberrations with different magnification ratios.

2. An optical objective consisting of a negatively refracting first component, a positively refracting second component, a positively refracting third component, a negatively refracting fourth component and a positively refracting fifth component, said components being constituted by meniscus-shaped lenses which are bounded by spherically curved surfaces all concave toward an intervening space separating said second and third components, said first, second, third, fourth and fifth components having respective individual focal lengths whose absolute magnitudes are related to one another in the ratio of substantially 7.5:1.1:2.7:9.7:1.6.

3. An objective as defined in claim 1 or 2 wherein said first component is a doublet consisting of a positive lens $L_1$ and a negative lens $L_2$, said second and third components being single lenses $L_3$ and $L_4$, said fourth component being a doublet consisting of a negative lens $L_5$ and a positive lens $L_6$, said first component being a single lens $L_7$.

4. An objective as defined in claim 3 wherein said lenses $L_1$ to $L_7$ have radii $r_1$ to $r_{12}$ and thicknesses and separations $d_1$ to $d_{11}$ whose numerical values, based upon a value of unity for the overall focal length of the objective, together with their refractive indices $n_e$ and their Abbé numbers $v_e$ are substantially as given in the following table:

| lenses | radii | thicknesses and separations | $n_e$ | $v_e$ |
|---|---|---|---|---|
| $L_1$ | $r_1 = +0.31$ | $d_1 = 0.11$ | 1.63 | 57 |
| | $r_2 = +7.78$ | | | |
| $L_2$ | | $d_2 = 0.08$ | 1.58 | 41 |
| | $r_3 = +0.21$ | | | |
| | | $d_3 = 0.03$ | | |
| $L_3$ | $r_4 = +0.31$ | $d_4 = 0.03$ | 1.69 | 48 |
| | $r_5 = +0.50$ | | | |
| | | $d_5 = 0.12$ | | |
| $L_4$ | $r_6 = -0.91$ | $d_6 = 0.02$ | 1.69 | 48 |
| | $r_7 = -0.62$ | | | |
| | | $d_7 = 0.03$ | | |
| $L_5$ | $r_8 = -0.18$ | $d_8 = 0.03$ | 1.63 | 35 |
| | $r_9 = -1.24$ | | | |
| $L_6$ | | $d_9 = 0.06$ | 1.67 | 48 |
| | $r_{10} = -0.23$ | | | |
| | | $d_{10} = 0.03$ | | |
| $L_7$ | $r_{11} = -1.10$ | $d_{11} = 0.03$ | 1.62 | 60 |
| | $r_{12} = -0.54$ | | | |

5. An objective as defined in claim 2, usable for photographic reproductions, wherein said first and second components are coupled for correlated codirectional axial shifts at a relatively slow and a relatively fast rate, respectively, to minimize optical aberrations with different magnification ratios.

6. An objective as defined in claim 4 wherein said first and second components are correlatedly shiftable to vary their air spaces $d_3$ and $d_5$ in opposite senses by up to about 0.015 times said overall focal length.

* * * * *